(12) United States Patent
Dupont et al.

(10) Patent No.: US 11,700,234 B2
(45) Date of Patent: Jul. 11, 2023

(54) EMAIL SECURITY BASED ON DISPLAY NAME AND ADDRESS

(71) Applicant: Cisco Technology, Inc., San Jose, CA (US)

(72) Inventors: Marc Dupont, Prague (CZ); Jan Brabec, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 17/213,657

(22) Filed: Mar. 26, 2021

(65) Prior Publication Data

US 2022/0239633 A1    Jul. 28, 2022

Related U.S. Application Data

(60) Provisional application No. 63/141,835, filed on Jan. 26, 2021.

(51) Int. Cl.
*H04L 29/06* (2006.01)
*H04L 9/40* (2022.01)
*H04L 51/212* (2022.01)

(52) U.S. Cl.
CPC ........ *H04L 63/0236* (2013.01); *H04L 51/212* (2022.05); *H04L 63/20* (2013.01)

(58) Field of Classification Search
CPC . H04L 63/0236; H04L 63/20; H04L 63/1433; H04L 63/14; H04L 63/1483; H04L 63/1466

USPC ............................................................ 726/1
See application file for complete search history.

(56) References Cited

U.S. PATENT DOCUMENTS

| 10,834,127 | B1 | 11/2020 | Yeh et al. |
| 11,195,217 | B2* | 12/2021 | Raman ............... G06Q 30/0641 |
| 2018/0152471 | A1* | 5/2018 | Jakobsson ............. G06Q 50/01 |
| 2018/0337947 | A1 | 11/2018 | Schiffman |
| 2019/0306192 | A1 | 10/2019 | Xie et al. |
| 2020/0099718 | A1 | 3/2020 | Li |
| 2020/0336451 | A1 | 10/2020 | Jakobsson |

FOREIGN PATENT DOCUMENTS

CN         110110218 A  *  8/2019

* cited by examiner

*Primary Examiner* — Longbit Chai
(74) *Attorney, Agent, or Firm* — Lee & Hayes, P.C.

(57) ABSTRACT

Techniques are described for detecting attacks that employ a display name in an email to impersonate an email sender. A computing infrastructure hosting an email security platform may determine a similarity between the display name and an email address from which the email was received. The email security platform may determine the similarity by comparing a string associated with the display name and a string associated with the sender address. The email security platform may generate a similarity value based on a result of the display name being compared with the sender address. The email security platform may determine that the email includes the display name impersonating a name of the sender, based on the similarity value meeting or exceeding a threshold value indicative of impersonation. The email security platform may delete or quarantine the email from an inbox associated with a user account.

20 Claims, 6 Drawing Sheets

EMAIL SECURITY BASED ON DISPLAY NAME AND ADDRESS

RELATED APPLICATIONS

This application claims priority to U.S. Provisional Patent Application No. 63/141,835 filed on Jan. 26, 2021, the entire contents of which are incorporated herein by reference.

TECHNICAL FIELD

The present disclosure relates generally to implementing an email security platform and detecting attacks that employ a display name in an email to impersonate an email sender.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications Due to the widespread use and necessity of email, hackers and other malicious entities use email as a primary channel for delivering malware and malware-less attacks against users. These malicious entities continue to employ more frequent and sophisticated social-engineering techniques for deception and impersonation (e.g., phishing, spoofing, etc.). As users continue to become savvier about identifying malicious attacks on email communications, malicious entities similarly continue to evolve and improve methods of attack.

Accordingly, an email security platform is provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, email service providers may be unable to progress at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
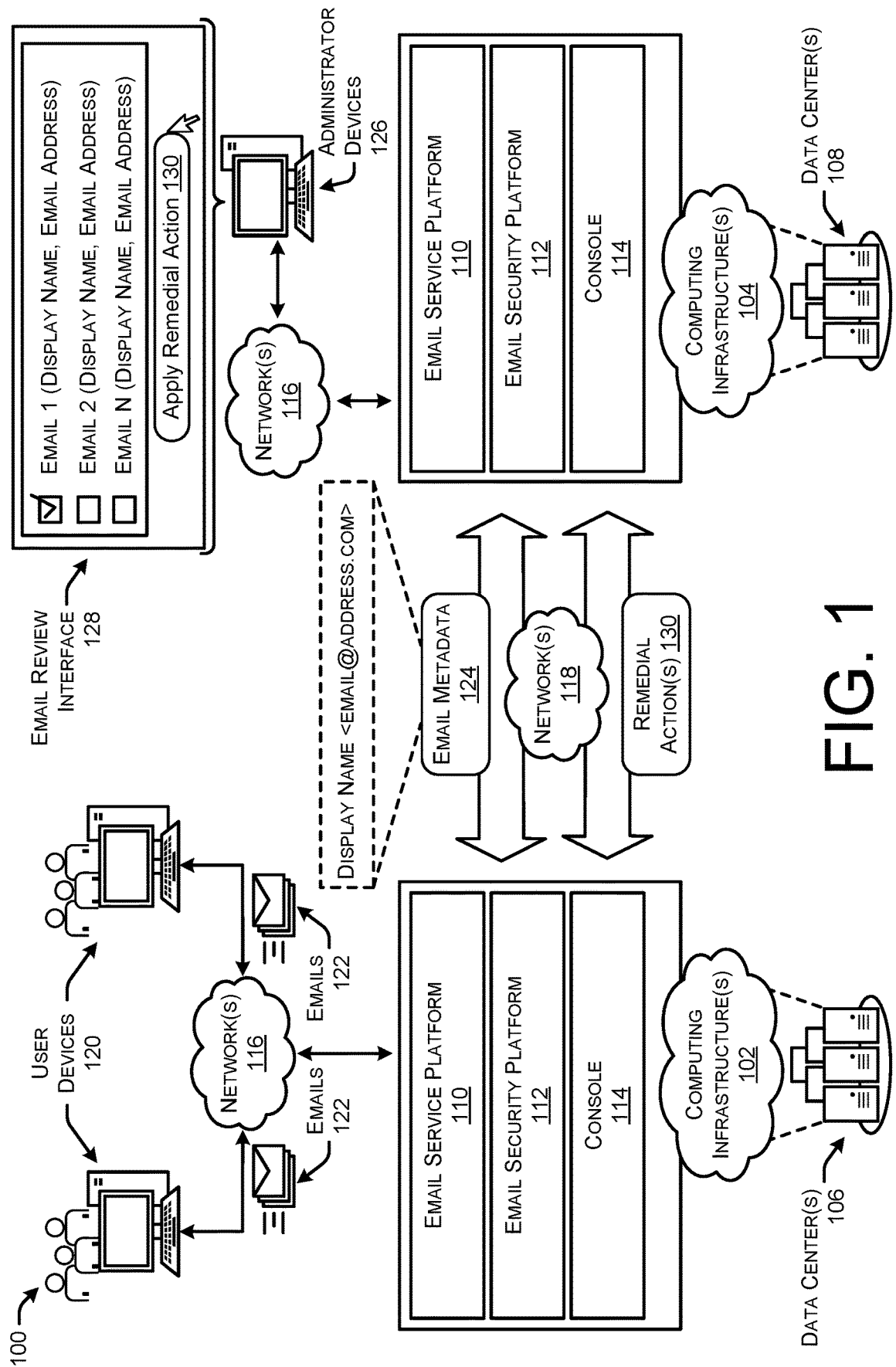
FIG. 1 illustrates a system-architecture diagram of an example distributed computing architecture that includes one or more computing architectures for determining whether emails are malicious based on display names and email addresses.

This disclosure describes techniques for detecting attacks that employ a display name in an email to impersonate an email sender. A method to perform techniques described herein includes receiving an email for a user account registered with an email service. Further, the method includes extracting, from the email, a sender name and a sender address associated with a sender of the email. Additionally, the method includes comparing, by the email security platform, the sender name with the sender address. Additionally, the method includes generating, by the email security platform, a similarity value based on a result of the sender name being compared with the sender address. Further, the method includes determining, by the email security platform, that the email comprises the sender name impersonating a name of the sender, based on the similarity value meeting or exceeding a threshold value indicative of impersonation. Additionally, the method includes deleting or quarantining the email from an inbox associated with the user account, based on the similarity value meeting or exceeding the threshold value.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for detecting attacks that employ a display name in an email to impersonate an email sender. Traditionally, email service providers may attempt to provide security analysis of emails for users of their email service. However, the security analysis performed by email service providers suffer from various inefficiencies, such as being unable to stay current on the newest attacks on email communications, lacking the amount of computing resources necessary to perform the security analysis, lacking availability of tools for performing the security analysis, and so forth. The security analysis may have difficulty in detecting and/or preventing attacks of certain types such as spear-phishing attacks and/or business email compromise (BEC) attacks, which may be particularly elusive due to those attacks not being confined to reliance on HTTP links or attachments. Those attacks may expose the users to unsolicited marketing and/or to more serious threats including unintentional disclosure of private and/or sensitive information.

According to the techniques described herein, an email security platform may extract header information integrated within emails that are received by the security platform. Relationships between characters of parts of the extracted header information may include a certain number of differences, but a sufficient number of similarities for the email security platform to make a decision as to whether an email is potentially malicious. The relationships may include lexical relationships between text of the display names and text of the sender addresses. The lexical relationships may utilized to numerically quantify a sentiment of alignment of the characters of the parts of the extracted header information.

The security analysis may be performed on the display names and the email addresses to detect malicious attacks and supplement other security analysis of various types that might otherwise allow certain types of attacks to be undetected. By detecting the similarities between the display names and the email addresses, the email security platform may refrain from routing malicious emails, thereby minimizing an amount of private or confidential content being incidentally exposed to malicious attackers. In this way, the malicious emails may be filtered out and privacy concerns around confidential data leaving the email security platform as a result of user responses otherwise resulting from the malicious emails are addressed. Resource-intensive processing techniques are avoided by preliminary detection of the similarities between the display names and the sender addresses, alleviating the need for the resource-intensive processing techniques to be performed. As described herein, the term "malicious" may be applied to data, actions, attackers, entities, emails, etc., and the term "malicious" may generally correspond to spam, phishing, spoofing, malware, viruses, and/or any other type of data, entities, or actions that may be considered or viewed as unwanted, negative, harmful, etc., for a recipient and/or destination email address associated with an email communication.

To implement the techniques described herein, the email security platform may work in unison with an email service platform as a multi-computing infrastructure. The email service platform may be included in a computing infrastructure. The email service platform may receive emails that are to be communicated to users of the email service, such as being stored at a location that is accessible to the users via their respective inboxes. As part of the intake process for emails, the email service platform may determine whether a destination email address is registered for use of the email security platform. If the destination email addresses for the emails are registered for use of the email security platform, the email service platform may perform the security analysis or send the emails to an email security platform. The security analysis may be performed by any email service platform, and the email security platform in the computing infrastructure, and/or one or more other email service platforms one or more other email security platforms. Each of the other email service platform(s) and the email security platform(s) may be included in the computing infrastructure and/or or another infrastructure.

After receiving an email from the service platform, a security analysis performed by the security platform may include analyzing the received email ("email") to determine sender information (e.g., "John Doe johndoe@example.com"), the sender information including a display name and a sender address. The received email may be analyzed to determine the display name at a placement (e.g., a beginning) of the sender information, and the email address at a placement (e.g., an end) of the sender information. The display name may be analyzed to determine different portions, the portions including a first name (e.g., a given name) and a last name (e.g., a surname) as groups of ASCII characters ("characters"), the groups being separated by a space (" ") character ("space"). The portions with the first name and the last name may be analyzed to determine the groups of characters as a string of characters ("string"). The string associated with the display name may be modified by removing the space to determine, as a modified string, the display name without the space. The sender information may be analyzed to determine, following the display name, a space and an email address (e.g., the space being between the display name and the email address). The email address may be analyzed to determine different portions, the portions including a username, a domain name, and a top-level domain (TLD), as groups of characters. The groups of characters including the email address may be analyzed, as a string, to determine a group of characters including the username being separated from a group of characters including the domain name, by an at-sign ("@") character ("at-sign") (e.g., a commercial at character). The string associated with the email address may be analyzed to determine the group of characters including the domain name being separated from a group of characters including the TLD, by a dot (".") character ("dot"). The string associated with the email address may be modified by removing the at-sign and the dot to determine, as a modified string (also referred to herein as "a modified email address string" and "a modified email address"), the email address without the at-sign and the dot.

After the modified string associated with the display name and the modified string associated with the email address are determined, the security analysis performed by the security platform may include performing a comparison between the modified strings. The comparison may be performed by executing an algorithm (e.g., a longest common substring (LCS) algorithm) on the modified strings to determine similarities between the display name and the email address. The algorithm may be executed to determine whether the modified string associated with the display name is similar to the modified string associated with the email address. The similarity may be determined based on whether one or more characters in the modified string associated with the display name match one or more characters in the modified string associated with the email address. A result of the comparison may be utilized to indicate whether to categorize and/or flag the email as a suspicious email. The result may indicate numerically whether the display name and the sender address are aligned (e.g., the display name and the sender address belonging together) or not aligned (e.g., the display name and the sender address not belonging together).

The result of the comparison between the modified string associated with the display name and the modified string associated with the email address may be determined as a similarity value (e.g., a similarity score). The email may be categorized and/or flagged as the suspicious email based on the similarity value meeting or exceeding a threshold value. The threshold value may be determined empirically based on historical data associated with previous security analyses. The threshold value may be set based on a level of security. The level of security may be determined as one of a plurality of levels of security. The levels of security may include a first level of security associated with a first percentage of a first number of suspicious emails in a total number of emails, and a second level of security associated with a second percentage of a second number of suspicious emails in the total number of emails. The first level of security may be set to be higher than the second level of level of security based on the first percentage being larger than the second percentage. The first number of suspicious emails may be determined as a number of first received emails in the total number of emails in the historical data being flagged as suspicious emails; and the second number of suspicious emails may be determined as a number of second received emails in the total number of emails in the historical data being flagged as suspicious emails, the first percentage being larger than the second percentage.

The email security platform may index the header information (e.g., metadata) associated with the emails, and may additionally provide a result of the security analysis for the email (e.g., potentially malicious, safe, unknown, etc.) along with the metadata for the emails. The email security platform may maintain a reporting datastore in the second computing infrastructure that stores the metadata and results of the security analysis. The reporting datastore may be accessible to users of the email security platform via a console (or other access means) through which the user can view and/or take actions on potentially malicious emails. For instance, the users may view, search, review, and/or request that the email security platform take an action on an email (e.g., quarantine, delete, flag, etc.). In this way, users are able to gain additional insights around the emails being communicated in their personal inbox and/or organization being monitored by, for example, an administrator. Upon determining that an action is to be taken on an email, the email security platform may provide an indication of the remedial action to the email service platform, which may in turn take that action on one or more emails (e.g., quarantine, delete, etc.).

The techniques described herein improve the functioning of email service platforms as well as email security platforms. For instance, rather than routing malicious emails that would otherwise be screened and/or filtered based on the comparison of the parts of the metadata, large amounts of processing may be conserved and/or reallocated to help with computing-resource overhead of the email service platforms and the email security platforms. In addition to reducing processing load, any of the email security platforms may have additional tools or resources that enable more effective and efficient security analysis of the emails. As a specific example, the computing infrastructure(s) may be public cloud infrastructures hosting an email security platform with a toolbox including particular tools for performing a header based security analysis on emails (e.g., analysis to compare the display name with the sender address), and/or private enterprise networks hosting an email service platform, and/or and an email security platform with a toolbox including particular tools for performing one or more security analyses on emails (e.g., a non-header based security analysis (e.g., analysis of attachments and/or links in emails)).

Additionally, the techniques described herein not only improve the ability to perform security analysis on emails, but the techniques also reduce the amount of data that is sent between the computing infrastructure(s) to perform security analysis, and/or reduce the amount of data that is sent from any of the computing infrastructure(s) to other devices (e.g., external devices, user devices, etc.). For instance, meaningful metadata may be extracted that is probative to whether an email is malicious or not, but private or sensitive information that users may not want to leave one of the computing infrastructure(s) may not be extracted or sent to any of the other computing infrastructure(s), or to another device (e.g., the user device). By only extracting meaningful metadata, privacy concerns are addressed and the amount of data communicated between computing infrastructures is minimized, thereby reducing the amount of bandwidth required. In some instances, one of the computing infrastructure(s) may be located in a first jurisdictional region (e.g., country, municipal, union, etc.), and another one of the computing infrastructure(s) and/or the other device (e.g., the user device) may be located in a second jurisdictional region different than the first jurisdictional region. In some instances, the types of email metadata sent across the jurisdictional boundaries may be limited or restricted based on different laws or regulations for those jurisdictions. For instance, various rules or regulations of the different jurisdictions may allow or restrict different data from being communicated in and out to protect privacy concerns. Accordingly, private data in emails may not be allowed to leave the computing infrastructure(s) and received by at least one of the other computing infrastructure(s) or the user device, in such examples.

The operations for extracting metadata from emails may be performed by the email security platform running in one of the computing infrastructure(s). However, this disclosure is not limited as such, and the techniques may equally be performed by components of the email service platform itself. That is, any of the computing infrastructure(s) may not host any components of the email security platform, and may provide the metadata to the email service platform of the computing infrastructure, and/or the email service platform or the email security platform running on another one of the computing infrastructure(s). Alternatively, the techniques performed by the email security platform may equally be performed by components of the email service platform itself. That is, any of the computing infrastructure(s) may not host any components of the email service platform, and may provide the metadata to the email security platform of the computing infrastructure, and/or the email service platform or the email security platform running on another one of the computing infrastructure(s).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example distributed computing architecture that includes one or more computing architectures 102 and 104 for determining whether emails are malicious based on display names and email addresses. The computing infrastructure(s) 102 and 104 perform analysis, and/or communicate data between each other, to implement security analysis on emails of the email service.

Generally, the computing infrastructure(s) 102 and 104 may include devices housed or located in one or more data centers 106 and 108, respectively, that may be located at different physical locations. For instance, the computing infrastructure(s) 102 and 104 may be supported by networks of devices in a public cloud computing platform, a private/enterprise computing platform, and/or any combination thereof. The data center(s) 106 and 108 may be physical facilities or buildings located across geographic areas that designated to store networked devices that are part of the computing infrastructure(s) 102 and 104. The data center(s) 106 and 108 may include various networking devices, as well as redundant or backup components and infrastructure for power supply, data communications connections, environmental controls, and various security devices. In some examples, the data center(s) 106 and 108 may include one or more virtual data centers which are a pool or collection of cloud infrastructure resources specifically designed for enterprise needs, and/or for cloud-based service provider needs. Generally, the data center(s) 106 and 108 (physical and/or virtual) may provide basic resources such as processor (CPU), memory (RAM), storage (disk), and networking (bandwidth). However, in some examples the devices in the computing infrastructure(s) 102 and 104 may not be located in explicitly defined data center(s) 106 and 108, but may be located in other locations or buildings.

Generally, the computing infrastructure(s) 102 and 104 may each correspond to different resource domains or pools that are owned and/or operated by different entities. For instance, any of the computing infrastructure(s) 102 and 104 may be a private enterprise network that is owned and operated by a company or other organization, or a public cloud infrastructure (or another enterprise infrastructure) owned and/or operated by another entity. In some instances, any of the computing infrastructure(s) (e.g., the computing infrastructure 102) may generally have a higher level of trust with users or clients than another one of the computing infrastructure(s) (e.g., the computing infrastructure 104) at least because, for example, the computing infrastructure 102 is hosting one or more email service platforms 110 and the computing infrastructure 104 is hosting one or more email security platforms 110.

The email service platform(s) 110 may generally include any type of email service provided by any provider, including public email service providers (e.g., Google Gmail, Microsoft Outlook, Yahoo! Mail, AOL, etc.), as well as private email service platforms maintained and/or operated by a private entity or enterprise. Further, the email service platform(s) 110 may include cloud-based email service platforms (e.g., Google G Suite, Microsoft Office 365, etc.) that host email services in the computing infrastructure(s) 102 and 104 (e.g., cloud infrastructure). However, the email service platform(s) 110 may generally include any type of platform for managing the communication of email communications between clients or users. The email service platform(s) 110 may generally include a delivery engine behind email communications, and further include the requisite software and hardware for delivering email communications between users. For instance, an entity may operate and maintain the software and/or hardware of the email service platform(s) 110 to allow users to send and receive emails, store and review emails in inboxes, manage and segment contact lists, build email templates, manage and modify inboxes and folders, scheduling, and/or any other operations performed using email service platform(s) 110.

The computing infrastructure(s) 102 and 104 may be hosting one or more email security platforms 112 that provide security analysis for emails communicated by the email service platform(s) 110. As noted above, the computing infrastructure(s) 102 and 104 (e.g., the email service platform(s) 110) may include a different domain and/or pool of resources used to host the email security platform(s) 112. Any of the computing infrastructures (e.g., the computing infrastructure 104) may be owned and/or operated by a different entity than that which owns or operates another one of the computing infrastructures (e.g., the computing infrastructure 102). In some instances, the computing infrastructure(s) 102 and 104 may work together, such as by forming an agreement, contract, etc., such that one or more of the email service platform(s) 110 and the email security platform(s) 112 are running or executing on one or more of the computing infrastructure(s) 102 and 104. The email service platform(s) 110 and the email security platform(s) 112 may generally include software components or resources that are running on the computing infrastructure(s) 102 and the 104 to perform pre-processing operations on email communications, such as by extracting metadata.

As illustrated, an email service platform 110 may provide one or more email services to users of user device 120 to enable the user devices 120 to communicate emails 122 over one or more networks 116, such as the Internet. However, the network(s) 116 may generally include one or more networks implemented by any viable communication technology, such as wired and/or wireless modalities and/or technologies. The network(s) 116 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 116 may include devices, virtual resources, or other nodes that relay packets from one device to another.

The user devices 120 may generally include any type of electronic device capable of communicating using email communications. For instance, the user devices 120 may include one or more of personal user devices (e.g., desktop computers, laptop computers, phones, tablets, wearable devices, entertainment devices such as televisions, etc.), network devices (e.g., servers, routers, switches, access points, etc.), and/or any other type of computing device. Thus, the user devices 120 may utilize the email service platform 110 to communicate using emails 122 based on email address domain name systems according to techniques known in the art.

The email service platform 110 may receive emails 122 that are destined for user devices 120 that have access to inboxes associated with destination email addresses managed, or provided, by the email service platform 110. That is, emails 122 are communicated over the network(s) 116 to one or more recipient servers of the email service platform 110, and the email service platform 110 determines which registered user the email 122 is intended for based on email information such as "To," "Cc," Bcc," and the like. In instances where users of the user device 120 have registered for use of an email security platform 112, an organization managing the user devices 120 has registered for use of the email security platform 112, and/or the email service platform 110 itself has registered for use of the email security platform 112, the email service platform 110 may provide the appropriate emails 122 to the email security platform 112 for pre-preprocessing of the security analysis process.

The email service platform 110 may refrain from scanning and/or extracting data from the email 122 that is private, sensitive, confidential, etc. in the emails. For instance, the email service platform 110 may refrain from scanning or extracting from the body of the emails 122, any attachments to the emails 122, and/or other information considered private. Generally, the email service platform 110 and/or users of the email security platform 112 may define what information is permitted to be scanned and/or extracted from the emails 122 by the email service platform 110, and what information is too private or confidential and is not permitted to be scanned and/or extracted from the emails 122 by the email service platform 110.

Upon extracting metadata (e.g., email metadata ("metadata") 124) from the emails 122 that is to be used for security analysis, the email service platform 110 may analyze sender information (e.g., "John Doe johndoe@example.com") in the metadata 124. The sender information may include display names and email addresses associated with senders of the emails 122. The computing infrastructure 102 may analyze the sender information to determine where there are similarities between the display names and the email addresses. The computing infrastructure 102 may then analyze the sender information to determine where there are similarities between the display names and the email addresses. By determining the similarities, any of the emails 122 being received from senders that are in a registry or list of names (e.g., a list of names associated with the email security platform 112 or a client (e.g., "Acme Corp") or business affiliate of a moral entity employing and/or otherwise being associated with a recipient of the email) may be determined as malicious or not malicious. Any of the emails 122 being received from senders with display names in the registry or list of names, but with display names not sufficiently matching (e.g., not matching at a sufficient amount) email addresses, may be marked as suspicious emails, notwithstanding the emails 122 being received without any attachments or links. Any of the emails 122 being received with sender names not sufficiently matching (e.g., not matching at a sufficient amount) email addresses, may be marked as suspicious emails, notwithstanding the emails 122 being received from senders with display names in the registry or list of names. The similarities between the display names and the email address may be utilized to identify malicious emails with domain names in the email addresses (e.g., a domain name associated with a party associated with the sender) being different from domain names associated with user accounts associated with recipients of the emails (e.g., a domain name associated with a party associated with the recipient), notwithstanding the emails 122 being received from senders with display names in the registry or list of names. In some examples, marking the emails 122 as suspicious based on the emails 122 being received with display names similar to email addresses, may include marking the emails 122 as suspicious, notwithstanding the display names being associated with (e.g., analogous to, similar to, variations of (e.g., variations as discussed below), etc.) names in the registry or the list of names.

Figure 3:
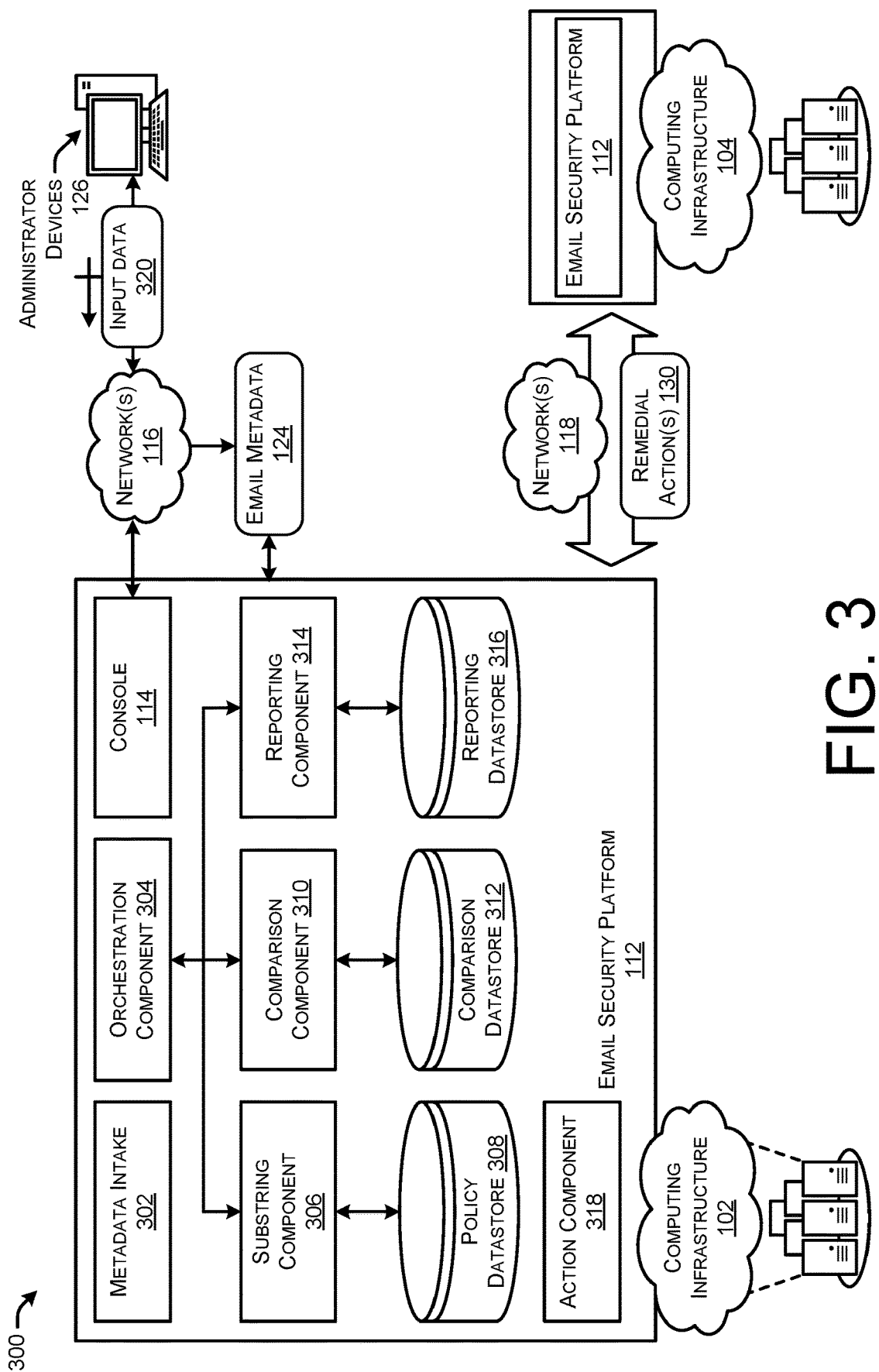
FIG. 3 illustrates a system-architecture diagram of components of one or more computing architectures that are hosting one or more email security platforms and are included in a distributed computing architecture.

As described in more detail in FIG. 3, the email security platform 112 may perform security analysis on the metadata 124 using, among other techniques, one or more security policies defined for the email security platform 112. The security policy(ies) may be defined or created by the email security platform 112 to detect potentially malicious emails, and/or be defined and/or created by administrators or other users of the email security platform 112. The email security platform 112 may analyze the metadata 124 with reference to the security policy(ies) to determine whether or not the metadata 124 violates one or more security policy(ies) that indicate the respective email 122 is potentially malicious. The security policy(ies) may be utilized to determine a percentage of the emails 122 that are flagged as potential malicious emails. For example, the security policy(ies) may include the threshold value indicative of impersonation. The security policy(ies) may be input by the user and to a user device 120, and may be received by the email security platform 112 and from the user device 120. Alternatively or additionally, the security policy(ies) may be input by an administrator and to an administrator device 126, and may be received by the email security platform 112 and from the administrator device 126. In some examples, any of the security policy(ies) described herein may be stored in the policy datastore 308, and/or any other component of the email security platform 112.

The email security platform 112 may further operate in cooperation with a console 114 that may serve as an access point for administrator devices 126 to view information regarding the emails 122 communicated by user devices 120. The console 114 may be combined with (e.g., integrated within or separate from) the email security platform 112. The console 114 may include any type of access means, such as one or more of web APIs, dashboards, user interfaces, terminal servers, and/or any other means by which an administrator device 126 may obtain or access information associated with emails 122. As described in more detail in FIG. 3, the administrator device 126 may be able to use administrative credentials to access information such as the metadata 124 for emails 122 communicated by users managed by entities operating the administrator devices 126, indications as to whether the emails 122 are potentially malicious, safe, unknown, and so forth. Further the console 114 may provide an email review interface 128 that, in addition to allowing the administrator devices 126 access to this information, perform other operations such as searching or segmenting email information, and taking remedial actions 130 with respect to an email 122 and/or a group of emails 122 communicated amongst user devices 120. Such remedial actions 130 may include, but are not limited to, quarantining an email 122 or a group of emails 122, deleting an email 122 or a group of emails 122, flagging an email 122 or a group of emails 122 as questionable or unknown, marking an email 122 or a group of emails 122 as safe, and so forth. Although the email service platform 110 may pre-process operations on email communications as discussed above in this disclosure, it is not limited as such and the operations on email communications may be pre-processed by any email security platform (e.g., the email security platform 112) in any computing infrastructure, independently or in cooperation with any email service platform in a same of different computing infrastructure. Although the email security platform 112 may perform security analysis on the metadata 124 as discussed above in this disclosure, it is not limited as such and the security analysis on the metadata 124 may be performed by any email service platform (e.g., the email service platform 110) in any computing infrastructure, independently or in cooperation with any email security platform in a same of different computing infrastructure.

In some instances, the administrator devices 126 may provide input indicating a remedial action 130 they would like to take with respect to an email 122 or a group of emails 122. In some instances, the email security platform 112 itself may be permitted to automatically determine and take remedial actions 130 to take on behalf of users. In one or both examples, the email security platform 112 may send indications of one or more remedial actions 130 for the email service platform 110 to take on one or more emails 122. The email service platform 110 may then take the remedial actions 130, and in some instances may report back results of those remedial actions 130 (e.g., success, failure, etc.).

The computing infrastructure(s) 102 may communicate via one or more networks 118, such as the Internet, to exchange the metadata 124 and/or perform the remedial actions 130. The network(s) 118 may be combined with (e.g., integrated within or separate from) any of the network(s) 116 and may be implemented as one or more networks, in a similar way as for the network(s) 116, as described above.

Figure 2:
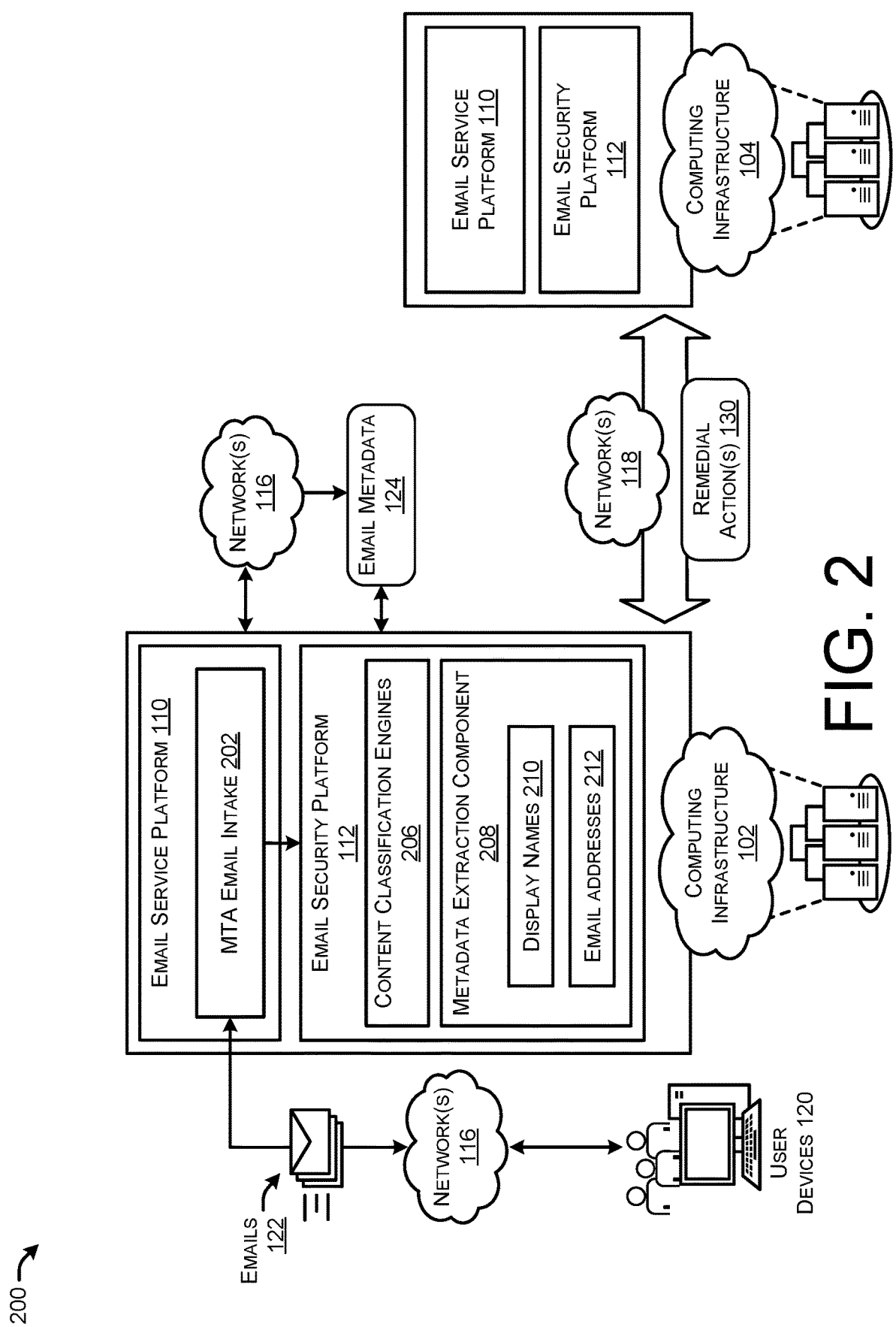
FIG. 2 illustrates a system-architecture diagram of components of one or more computing architectures that are hosting one or more email service platforms and are included in a distributed computing architecture.

FIG. 2 illustrates a system-architecture diagram 200 of components of one or more computing architectures 102 and 104 that are hosting one or more email service platforms 110 and are included in a distributed computing architecture.

As described above in FIG. 1, the email service platform 110 may generally provide a service to communicate emails 122 between user devices 120. Although not illustrated, the email service platform 110 may include various software and/or hardware components for providing an email service to users according to techniques known in the art. Further, the email service platform 110 may include a material transfer agreement (MTA) email intake (e.g., an intake MTA server) 202 that receives the emails 122 communicated from user devices 120 that are to be sent to inboxes of destination email addresses associated with the email service platform 110. The email service platform 110 may journal the emails 122 to the MTA email intake 202.

The MTA email intake 202 may determine whether the emails 122 have attachments, and if they do, the MTA email intake 202 may take the attachments and temporarily store them in a data store (e.g., a data store of the intake MTA email server, or another internal or external server). Further, the MTA email intake 202 may forward the emails 122 to the email security platform 112 for further analysis, based on the emails 122 being received from destination email addresses in the "To" portion of the emails 122 with registered email addresses associated with the email security platform 112. If the destination email address(es) for an email 122 are not registered email addresses, then the email 122 will be dropped from further processing by the computing infrastructure 102.

The computing infrastructure 102 may receive the emails 122 using, for example, Remote Procedure Call (RPC) (e.g., gRPC). The computing infrastructure 102 may scan or classify, as metadata 124, content including headers of the emails 122. The computing infrastructure 102 may include one or more content classification engines 206 and a metadata extraction component 208. Generally, the content classification engine(s) 206 may include any type of scanner or engine that examines the email 122, and classifies content of the email 122. The content classification engine(s) 206 may work in conjunction with the metadata extraction component 208 in order to identify and extract the metadata 124 from the emails 122. For instance, the metadata 124 extracted by the metadata extraction component 208 may include sender information (e.g., "John Doe johndoe@example.com") from emails 122. The sender information may include display names 210 and email addresses 212 associated with senders of the emails 122. The computing infrastructure 102 may analyze the sender information to determine where there are similarities between the display names 210 and the email addresses 212.

The email service platform 110 may refrain from scanning and/or extracting content including private or sensitive portions of the emails 122 (e.g., subjects and/or bodies of the emails 122, attachments to the emails 122, etc.). The email service platform 110 may refrain from sending the private or sensitive portions out of the first computing infrastructure 102. Although the content of the emails 122 is not analyzed by the email service platform 110 according to the techniques described above in this disclosure, it is not limited as such and any component can be operated to analyze the content, such as the email service platform 110 in the computing infrastructure(s) 102 and 104, or a malware service that interacts with the computing infrastructure(s) 102 and 104.

After identifying and extracting the metadata 124, the computing infrastructure 102 may analyze sender information in the metadata 124, determine remedial action(s) 130 for the computing infrastructure 102 and/or the computing infrastructure 104, and/or send the metadata 124 to over the network(s) 118 to the email security platform 112 hosted on the computing infrastructure 104. As discussed in FIG. 1, and more in FIG. 3, the computing infrastructure 102 and/or the computing infrastructure 104 may analyze sender information of the metadata 124 and/or determine remedial action(s) 130 for the computing infrastructure 102 and/or the computing infrastructure 104.

FIG. 3 illustrates a system-architecture diagram 300 of components of one or more computing architectures 102 and 104 that are hosting one or more email security platforms 112 and are included in a distributed computing architecture.

As described above in FIGS. 1 and 2, the one or more computing infrastructure(s) 102 and 104 may receive metadata 124 over network(s) 116, and may host one or more email security platforms 112 to perform security analysis on the metadata 124 for email communications 122. The email security platform(s) 112 may include a metadata intake 302 that serves as a border system that accepts content, including the metadata 124, over the network(s) 116. The metadata intake 302 may be a compute instance, and/or run as a virtual machine and/or container.

The metadata intake 302 may provide one or more queries to analyze emails to an orchestration component 304, which may include a function executing in the computing infrastructure(s) 102 and 104 (e.g. the computing infrastructure 102). The orchestration component 304 may distribute the queries for security analysis of the metadata 124 to different system components of the email security platform(s) 112 (e.g., the email security platform 112). In some instances, the system components with which the orchestration component 304 interacts may include a substring component 306, a comparison component 310, and/or a reporting component 314. In those instances, any of the substring component 306, the comparison component 310, and/or the reporting component 314 may interact with the other components and perform their respective operations in any order.

The substring component 306 may receive the metadata 124 and determine the sender information in the metadata 124. The substring component 306 may analyze the metadata 124 to determine (e.g., extract) the display name 210 at a placement (e.g., a beginning) of the sender information, and the email address 212 at a placement (e.g., an end) of the sender information. The display name 210 may be analyzed to determine different portions, the portions including a portion with a first name (e.g., a given name) as a group of ASCII characters ("characters"), and a portion with a last name (e.g., a surname) as a group of characters. The groups may be separated by a space (" ") character ("space"). The portions with the first name and the last name may be analyzed to determine a combined group, with the groups of characters, as a string of characters ("string") (e.g., a display name string). The string associated with the display name 210 may be modified by removing the space to determine, as a modified string (also referred to herein as "a modified display name string" and "a modified display name"), the display name 210 without the space. In some examples, the modified display name string may be associated with the display name 210 without any spaces having been removed, based on the display name 210 in the metadata not having any spaces. In some examples, the modified display name string may be associated with the display name 210 including a single name (e.g., a given name or a surname, or any variation of any name of the display name 210). In some examples, the modified display name string may be associated with the display name 210 including one or more names and/or word groups (e.g., one or more of any word group including a given name, a middle name, a surname, a prefix, a title, a suffix, a variation of any word group (as discussed below with respect to variations of the display name 210), etc., being separated from any adjacent words groups by a space)), the modified display name string being determined based on any number of spaces (e.g., all of the spaces) being removed from the display name string. The modified display name string may be determined based on one or more security policies stored in a policy datastore 308.

The substring component 306 may determine one or more other names of other versions associated with any of the names in the display name 210. For example, the one or more other names may include, but are not excluded to, variations of any of the names in the display name 210, the variations including acronyms, synonyms, pseudonyms, abbreviations, initialisms, contractions, abridgements, augmentations, idioms, native, and/or common names, regional and/or geographically based names, phonetically spelled names, colloquialisms, etc. The other name(s) of the display name 210 may be received as a name in the display name 210 in the metadata, and/or may be determined (e.g., determined by the substring component 306), based on any of the names in the display name 210, via information provided in response to a query via the network(s) 116, and/or via information provided by any component of the computing infrastructure(s) 102 and 104. By way of example, the other name(s) may be generated based on the display name 210, and on one or more security policies stored in the policy datastore 308. In some examples, the query, and/or the information provided in response to the query via the network(s) 116, may be provided automatically (e.g., automatically retrieved), without user input. In some examples, the information utilized to determine the variations (e.g., the information acquired based on the query and/or on automatic retrieval) may be provided by one or more internal and/or external databases and/or one or more system(s), any of the internal and/or external database(s) and/or the system(s) being accessible via the network(s) 116 and/or the Internet. Alternatively or additionally, the query may be transmitted to, and/or the information received in response to the query may be provided by, the administrator device 126 via the network(s) 116.

The other name(s) may be analyzed to determine one or more portions included in each of the other name(s). In some examples, each of the portion(s) may include a portion associated with a group of characters. In other examples, each of the portion(s) may include more than one portion, with each of the more than one portion being a group of characters separate by a space. Each of the portion(s) may be analyzed to determine a combined group, as a string, the combined group including the group(s) of characters. The string associated with the other name(s) of variations of the display name 210 may be modified by removing any spaces to determine, as a modified string (also referred to herein as "a modified other name string" and "a modified other name"), the other name(s) without any spaces. In some instances, each of the other name(s) may be analyzed to determine the string associated with the other name.

The substring component 306 may analyze the sender information, based on the security policy(ies), to determine a space following the display name 210, and, following the space, an email address 212. The email address 212 may be analyzed to determine different portions, a portion including a username as a group of characters, a portion including a domain name as a group of characters, and a portion including a top-level domain (TLD) (e.g., "com," "org," "net," etc.) as a group of characters (e.g., one or more characters of a last segment of a domain name, after a dot). By way of example, the different portions may be determined based on the security policy(ies). A combined group, with the groups of characters in the email address 212, may be analyzed, as a string (e.g., an email address string), to determine the group of characters with the username being separated from the group of characters with the domain name, by an at-sign ("@") character ("at-sign"). The string associated with the email address 212 may be analyzed to determine the group of characters including the domain name being separated from a group of characters including the TLD, by a dot (".") character ("dot"). The string associated with the email address 212 may be modified by removing the at-sign and punctuation (e.g., the dot) to determine, as a modified string, the email address 212 without the at-sign and the dot. The modified email address string may be determined based on the security policy(ies) and may be a utilized as a replacement for the email address string (e.g., the email address 212).

The comparison component 310 may perform, based on the security policy(ies), a comparison between the display name 210 and the email address 212 (e.g., a comparison between a display name and the email address, or between a modified display name and the email address (e.g., a comparison between the modified string associated with the display name 210 and the modified string associated with the email address 212)). The security policy(ies) may be obtained from the policy datastore 308 and via the orchestration component 304. To perform the comparison, the comparison component 310 may execute an algorithm on the modified strings to determine similarities between the display name 210 and the email address 212. The algorithm may be determined based on the security policy(ies). The algorithm may be a longest common substring (LCS) algorithm. The algorithm may be executed to determine whether the modified string associated with the display name 210 is similar to the modified string associated with the email address 212. The algorithm may be executed to determine whether a number of characters in the modified string associated with the display name 210 is the same as a number of characters in the modified string associated with the email address 212 (e.g., whether the modified string associated with the display name 210 is a same (or similar) length as the modified string associated with the email address 212 (e.g., whether a difference a length of the modified string associated with the display name 210 and a length of the modified string associated with the email address 212 is below a threshold length)). The comparison component 310 may determine a similarity between the display name 210 and the email address 212, based on the modified string associated with the display name 210 being similar to the modified string associated with the email address 212. The comparison component 310 may determine the similarity further based on whether the modified string associated with the display name 210 is the same (or similar) length as the modified string associated with the email address 212. The similarity may be based on whether one or more characters in the modified string associated with the display name 210 match one or more characters in the modified string associated with the email address 212. The comparison component 310 may determine a comparison result based on one or more characters (e.g., one or more sequential and/or adjacent (e.g., unseparated, consecutive, etc.) characters) in the modified string associated with the display name 210 matching one or more characters (e.g., one or more sequential and/or adjacent (e.g., unseparated, consecutive, etc.) characters) in the modified string associated with the email address 212. The comparison result may be utilized to indicate whether to categorize and/or flag the email 122 as a suspicious email. The comparison result may indicate numerically whether the display name 210 and the email address 212 are aligned (e.g., the display name 210 and the email address 212 belong together) or not aligned (e.g., the display name 210 and the email address 212 do not belong together). Although the algorithm may be the LCS algorithm as discussed above in this disclosure, it is not limited as such and can include any the algorithm as any algorithm for comparing groups of characters (e.g., an edit distance based algorithm, a token based algorithm, a sequence based algorithm (e.g., a longest common subsequence algorithm), etc.).

The comparison component 310 may perform, based on the security policy(ies), a comparison between any of the other name(s) and the email address 212 (e.g., a comparison between another name and the email address or between the modified other name and the email address (e.g., a comparison between the modified string associated with any of the other name(s) and the modified string associated with the email address 212)). The security policy(ies) may be retrieved and analyzed to determine whether the comparison is performed between the display name 210 and the email address 212, between any of the other name(s) and the email address 212, etc. The comparison component 310 may determine a similarity between each of the other name(s) and the email address 212 to indicate whether to categorize and/or flag the email 122 as the suspicious email. The similarity associated with each of the other name(s) may be determined similarly as discussed above for the similarity associated with the display name 210. Although the comparison may be performed based on any of the modified strings, to improve accuracy of a result of the comparison, as discussed above in this disclosure, it is not limited as such and can include the comparison being performed based on the strings without modifications (e.g., subsequent modifications). Although the modified display name and the modified other name may be determined based on the display name as discussed in this disclosure, it is not limited as such and the modified other name may be utilized instead of the modified display name in any of the functions discussed herein.

The comparison component 310 may determine, as a similarity value ("modified similarity value"), the comparison result between either of the string or the modified string associated with the display name 210 and either of the string or the modified string associated with the email address 212. By way of example, the similarity value may be determined based on first characters in either of the string or the modified string associated with the display name 210 (e.g., a first string), either of the string or the modified string associated with the email address 212 (e.g., a second string), and one or more first consecutive characters in a first substring of the first string being determined to match one or more second consecutive characters in a second substring of the second string, the first substring being a same length as the second substring. For example, the similarity value may be related (e.g., directly related) to the comparison result (e.g., a first similarity value associated with a first comparison result that is higher than a second comparison result may be higher than a second similarity value associated with the second comparison result). The comparison component 310 may categorize and/or flag the email 122 as the suspicious email based on the similarity value meeting or exceeding a threshold value. The security policy(ies) may be retrieved and/or analyzed to determine whether the email 122 is categorized and/or flagged. By categorizing the email 122, the comparison component 310 may determine an indicator associated with a category (e.g., a category indicating a severity of danger, a likelihood of the email 122 being malicious, a predicted level of accuracy of the email 122 being determined as malicious, etc.) associated with the email 122. By flagging the email 122, the comparison component 310 may determine an indicator associated with the email being flagged as malicious or not malicious. The indicator associated with the category and/or the indicator associated with the flag may be stored for retrieval from any component of the computing infrastructure(s) 102 and 104 for performing any operations associated with the email 122. The indicator associated with the category and/or the indicator associated with the flag may be combined with (e.g., integrated within or separate from) the email 122, and transmitted along with the email 122.

The comparison component 310 may determine, as a similarity value ("modified similarity value"), the comparison result between either of the string or the modified string associated with each of the other name(s) and either of the string or the modified string associated with the email address 212. By way of example, the similarity value may be determined based on first characters in either of the string or the modified string associated with each of the other name(s) (e.g., a first string), either of the string or the modified string associated with the email address 212 (e.g., a second string), and one or more first consecutive characters in a first substring of the first string being determined to match one or more second consecutive characters in a second substring of the second string, the first substring being a same length as the second substring. The comparison component 310 may categorize and/or flag the email 122, based on the similarity value. The similarity value associated with the each of other name(s) may be determined similarly as discussed above for the similarity value associated with the display name 210. The emails 122 may be categorized and/or the flagged based on each of the other name(s) similarly as discussed above for the emails 122 that are categorized and/or the flagged based on the display name 210.

In some examples, any of the similarity values determined based on any of the comparisons discussed above, may be determined directly based on any of the comparisons (e.g., the similarity value(s) may be determined without determining the comparison result(s)). Although the similarity value is determine by the comparison component 310 based on the display name 210 and/or other name(s) being compared to the email address(es) as discussed above in this disclosure, it is not limited as such and the any functions (e.g., comparisons) utilizing the similarity value can be implemented by utilizing the modified similarity value.

The comparison component 310 may determine a confidence score based on the comparison between the modified string associated with each of the display name and/or the other name(s), and the modified string associated with the email address. The confidence score may be determined based on, or not based on, the comparison value, and may be determined along with, or not along with, the similarity value. For example, the confidence score may be determined based on the difference between a comparison value (e.g., a comparison result or a similarity value) of the display name string being compared with the email address string, and a threshold value. The confidence score may be further determined, as a modified confidence score, by normalizing and scaling the difference, as a modified difference. The modified confidence score may be determined as a more consistent point of comparison with other modified confidence scores, than for the confidence score not utilizing the normalizing and scaling.

The comparison component 310 may determine the threshold value empirically based on historical data associated with one or more previous security analyses (e.g., previous security analys(es) determined by the second computing infrastructure 104 or any external system). The threshold value may be set based on a level of security. The level of security may be determined as one of a plurality of levels of security. The levels of security may include a first level of security associated with a first percentage of a first number of suspicious emails in a total number of emails, and a second level of security associated with a second percentage of a second number of suspicious emails in the total number of emails. The first level of security may be set to be higher than the second level of level of security based on the first percentage being larger than the second percentage. The first number of suspicious emails may be determined as a number of first received emails in the total number of emails in the historical data being flagged as suspicious emails; and the second number of suspicious emails may be determined as a number of second received emails in the total number of emails in the historical data being flagged as suspicious emails, the first percentage being larger than the second percentage.

The orchestration component 304 may obtain result data from the substring component 306 and/or the comparison component 310, and provide the result data to a reporting component 314 to be stored in the reporting datastore 316. Thus, the reporting datastore 316 may store information around whether the metadata 124 is associated with the email 122 having the malicious attachment, the information including the similarity value, the category (e.g., the indicator associated with the category), and/or the flag (e.g., the indicator associated with the flag). The information stored in the reporting datastore 316 may include a similarity value (e.g., a single similarity value) associated with the display name 210 and all of the other name(s); or the information may include a similarity value associated with the display name 210 and separate respective similarity values associated with each of the other name(s), or some combination thereof. In some examples, the information may include a similarity value associated with the display name 210, and a similarity value associated with one or more of the other name(s). In some examples, the information may include a similarity value associated with the display name 210, and more than one similarity value being each associated with a subset of the other name(s). For example, the more than one similarity value may include a first similarity value associated with a first subset (e.g., one or more names) of the other name(s) associated with a first category and/or a first flag, and a second similarity value associated with a second subset (e.g., one or more names) of the other name(s) associated with a second category and/or a second flag.

Although the orchestration component 304 may provide the result data to the reporting component 314 as discussed above in this disclosure, it is not limited as such and any of the substring component 306 and/or the comparison component 310 may provide the result data to the reporting component 314 to be stored in the reporting datastore 316. Although the orchestration component 304 may exchange data between any of the substring component 306, the policy datastore 308, the comparison component 310, the comparison datastore 312, the reporting component 314, and the porting datastore 316 as discussed above in this disclosure, it is not limited as such and data may be provided, with or without utilizing the orchestration component 304, to and from any of those components (e.g., the security policy(ies) may be provided from the policy datastore 308 to the comparison component 310).

A designation of the substring component 306, the comparison component 310, and/or the reporting component 314 for performing any of the operations by, and/or a designation of an order therefor, may be managed by one or more of the orchestration component 304, the substring component 306, the comparison component 310, and the reporting component 314. For example, the substring component 306 may transmit a signal to the comparison component 310 to perform a comparison operation, which transmit a signal to the reporting component 314 to perform a reporting operation; and, subsequently, the comparison component 310 and/or the reporting component 314 may transmit a signal to the substring component 306 to perform an additional (e.g., a more thorough and/or accurate) substring generation operation and/or a different substring generation operation (e.g., an operation to generate another version of the display name 210 instead of a full version of the display name 210, or vice versa); and the substring component 306 may then transmit a signal to the comparison component 310 for an additional (e.g., a more thorough and/or accurate) comparison operation and/or a different comparison operation (e.g., an operation to perform a comparison based on the other version of the display name 210 instead of the full version of the display name 210, or vice versa.

The result of each of the components (e.g., the substring component 306, the comparison component 310, or the reporting component 314) may be provided along with the signal transmitted by the component, and utilized by the component receiving the signal. For example, the substring component 306 may determine which version of the display name 210 to utilize for generating the display name string, based on one or more results received from the comparison component 310 and/or the reporting component 314. For example, the comparison component 310 may determine which version of the display name 210 to utilize for performing the comparison, based on one or more results received from the substring component 306 and/or one or more results received from the reporting component 314. For example, the reporting component 314 may determine which result to utilize for performing the reporting operation, based on one or more results received from the comparison component 310 and/or one or more results received from substring component 306.

The orchestration component 304 may annotate the metadata 124 with domain information such as the security policy(ies) obtained from the policy datastore 308. For example, the metadata 124 may be annotated by a substring component 306 integrated within, or separate from, the orchestration component 304. The substring component 306 may use a destination email address for the metadata 124 to identify, from the policy datastore 308, the security policy(ies) to use for analyzing the metadata 124.

The substring component 306 may then utilize the security policy(ies) for the email addresses associated with the metadata 124 to analyze the metadata 124 to determine if the corresponding email 122 is malicious. The substring component 306 may analyze, based on the security policy(ies), sender information associated with the metadata 124, the sender information including a display name (e.g., the display name 210 described in FIG. 2) and a sender address (e.g., the email address 212 described in FIG. 2). The substring component 306 may then generate result data indicating a result of the security analysis of the metadata 124 using the security policy(ies) stored in the policy datastore 308. Further, the orchestration component 304 may separate and/or extract any attachments to the email 122. The orchestration component 304 may obtain result data from the substring component 306 and/or from the comparison component 310, and provide the result data to a reporting component 314 to be stored in the reporting datastore 316. Thus, the reporting datastore 316 may indicate information around whether the metadata 124 is associated with the email 122 having the malicious attachment. The report data associated with the policy component and/or the attachment component may be combined with (e.g., integrated within or separate from), as combined report data, the report data associated with the substring component 306 and/or the comparison component 310.

The reporting component 314 may interact with the console 114 described in FIG. 1 in order to provide administrator devices 126 with access to view any of the data stored in the reporting datastore 316, and/or provide input data 320 indicating actions to be taken for one or more emails 122. As described in FIG. 1, the administrator devices 126 may indicate one or more remedial actions 130 to be taken with respect to the email(s) 122. The email security platform 112 may include an action component 318 that dispatches indications of the remedial action(s) 130 to the computing infrastructure(s) 102 and 104 that cause the email service platform(s) 110 (e.g., the email service platform 110), which communicate via the network(s) 118, to take the remedial action(s) 130.

Although the metadata intake 302, the orchestration component 304, the console 114, the substring component 306, the comparison component 310, the reporting component 314, the policy datastore 308, the comparison datastore 312, the reporting datastore 316, and/or the action component 318 are separate modules (e.g., intakes, components, datastores, etc.) as discussed above in this disclosure, it is not limited as such and one or more of those modules can be implemented as a single component in combination with (e.g., integrated within, or separate from) the email security platform 112. Although the orchestration component 304 may perform operations, and/or orchestrate operations performed by the substring component 306, the comparison component 310, and/or the reporting component 314, in an order including determining the similarities in the sender information previously to performing the security analysis techniques as discussed above in this disclosure, it is not limited as such and can include the similarities being determined and one or more of the security analysis techniques being performed in any order. Although the computing infrastructure 102 may include the components (e.g., the orchestration component 304, the substring component 306, the comparison component 310, the reporting component 314, the action component 318, etc.) and/or the datastores (e.g., the policy datastore 308, the comparison datastore 312, the reporting datastore 316, etc.) associated with determining similarities associated with the sender information as discussed in this disclosure, it is not limited as such and can include any, or all, of those components and/or datastores being provided within the computing infrastructure 104 to determine the similarities. Any of those components and/or datastores may be included within one or both of any computing infrastructure (e.g., the computing infrastructure(s) 102 and 104 (e.g., the email security platform(s) 112 and the email security platform(s) 114)).

Figure 4:
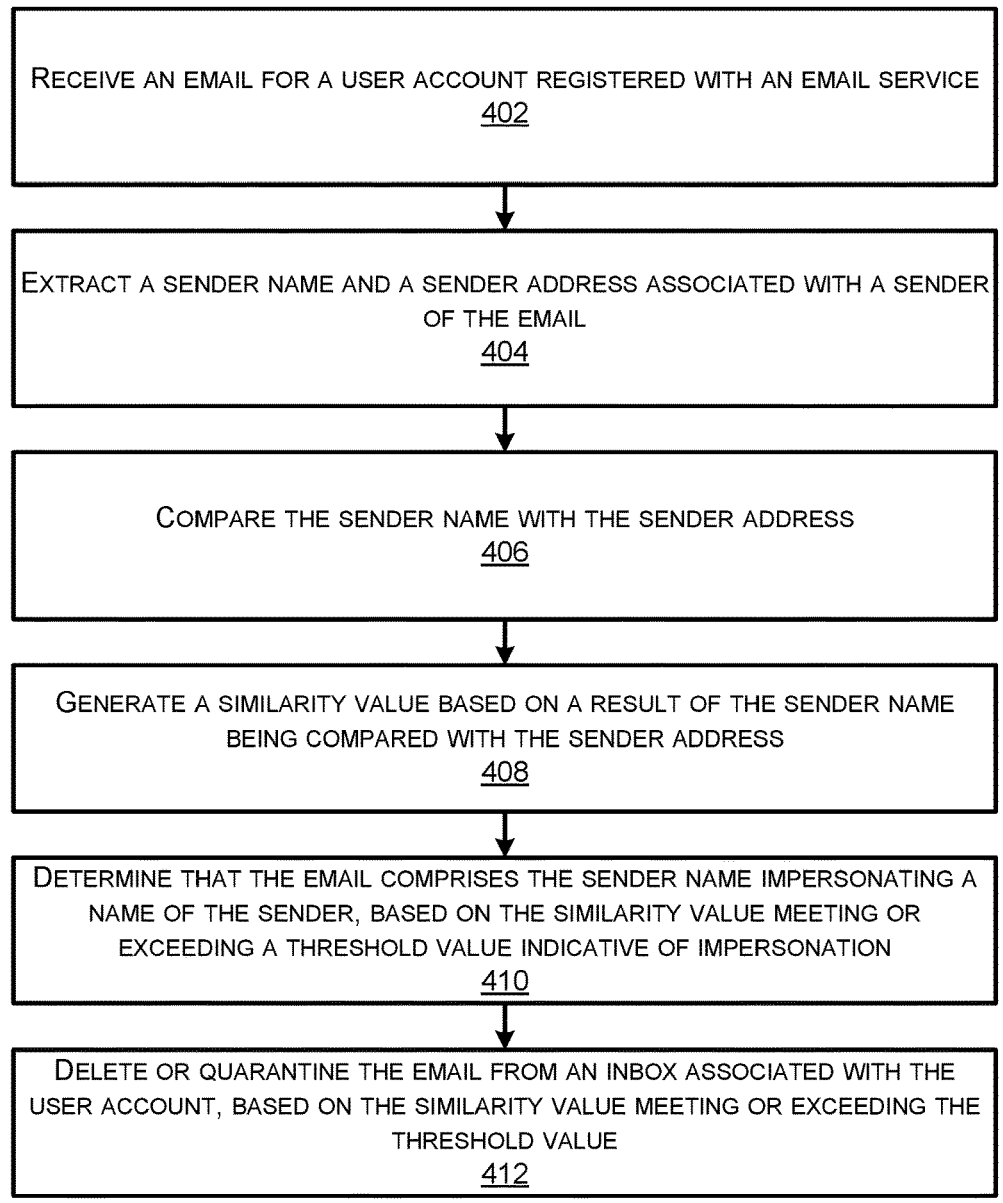
FIG. 4 illustrates a flow diagram of an example method for determining whether emails are malicious based on display names and email addresses.

FIG. 4 illustrates a flow diagram of an example method for determining whether emails are malicious based on display names and email addresses. The techniques may be applied by a system including one or more processors, and one or more non-transitory computer-readable media storing computer-executable instructions that, when executed by the one or more processors, cause the one or more processors to perform operations of method 400.

At 402, one or more computing infrastructure(s) (e.g., the computing infrastructure 102) may receive an email for a user account registered with an email service. An email service platform 110 and an email security platform 112 may be running or executing on the computing infrastructure 102. The email service platform 110 may be utilized by a user device to communicate using an email 122 based on an email address domain name system. The email security platform 112 may generally include software components or resources that are running on the computing infrastructure 102 to perform pre-processing operations on email communications.

At 404, the computing infrastructure 102 may extract, from the email 122, a sender name (e.g., the display name 210) and a sender address (e.g., the email address 212) associated with a sender of the email 122. The display name 210 and the email address 212 are extracted to obtain information utilized for content pre-classification on the email 122, including scanning and/or classifying private or sensitive portions of the email 122. The private or sensitive portions of the email 122 may be scanned and/or classified based on whether the display name 210 is determined to be associated with the email address 212.

At 406, the email security platform 112 may compare the display name 210 with the email address 212. To compare the display name 210 with the email address 212, the substring component 306 of the email security platform 112 may analyze metadata 124 associated with the email 122 to determine the display name 210 at a beginning of the sender information, and the email address 212 at an end of the sender information. The substring component 306 may determine a string associated with the display name 210 and determine whether the display name 210 includes a space between names of the display name 210. The string may be determined by removing the space, based on the substring component 306 determining the space is included between the names. The substring component 306 may determine a string associated with the email address 212, by removing an at-sign, a dot, and a top-level domain (TLD) from the email address 212. The comparison component 310 may perform a comparison between the display name string and the email address string. The comparison component 310 may determine a comparison result based on one or more characters (e.g., one or more sequential and/or adjacent/unseparated characters) in the display name string matching one or more characters (e.g., one or more sequential and/or adjacent/unseparated characters) in the email address string. The comparison may include other name(s) that are variations of the display name 210 being compared with the email address 212.

At 408, the email security platform 112 may generate a similarity value based on a result of the display name 210 being compared with the email address 212. The comparison component 310 may determine, as the similarity value, the comparison result between the display name string and the email address string. The similarity value may include the similarity value associated with a malicious email that is higher a similarity value determine previously or subsequently that is not associated with a malicious email.

At 410, the email security platform 112 may determine whether the email 122 includes the display name 210 impersonating a name of the sender, based on the similarity value meeting or exceeding a threshold value indicative of impersonation. The comparison component 310 may determine the threshold value empirically based on historical data associated with one or more previous security analyses. The threshold value may be set based on a level of security.

At 412 the email security platform 112 may delete or quarantine the email 122 from an inbox associated with the user account, based on the similarity value meeting or exceeding the threshold value. The email 122 may be deleted or quarantined automatically or based on a selection received from an administrator device. The selection may include a delete operation or a quarantine operation being selected from a plurality of operations, the operations further including a mark-as-safe operation and/or a flag-as-malicious operation. The administrator device may provide further input indicating whether to apply the delete operation or the quarantine operation, as a selection operation, for each selection listing for a single user, and/or across all users of a grouping of users (e.g., users in a domain space, users belonging to an organization, etc.).

Figure 5:
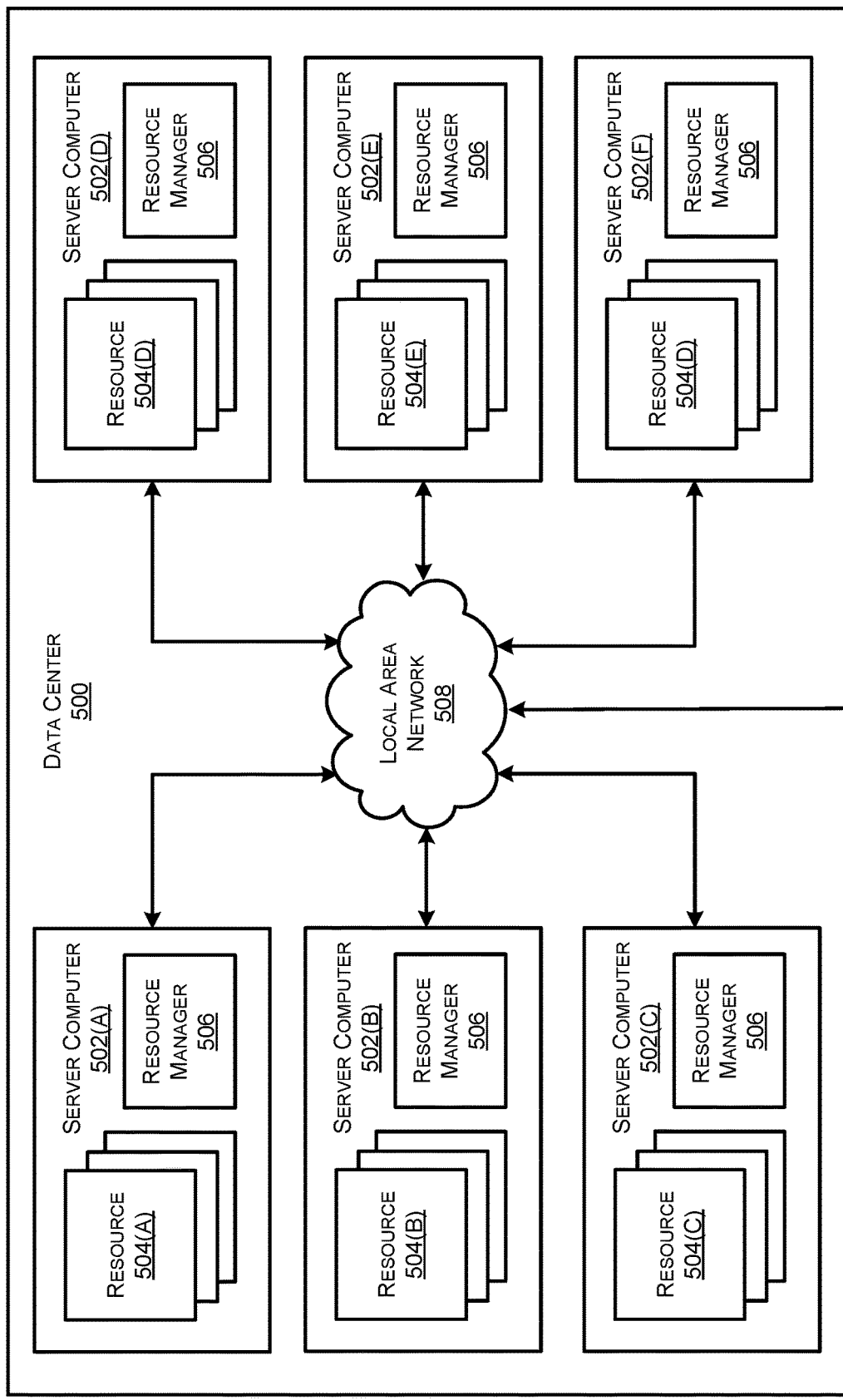
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, the any type of networked device described herein. Although described as servers, the server computers 502 may include any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more application containers and/or virtual machines ("VMs") to perform techniques described herein. In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
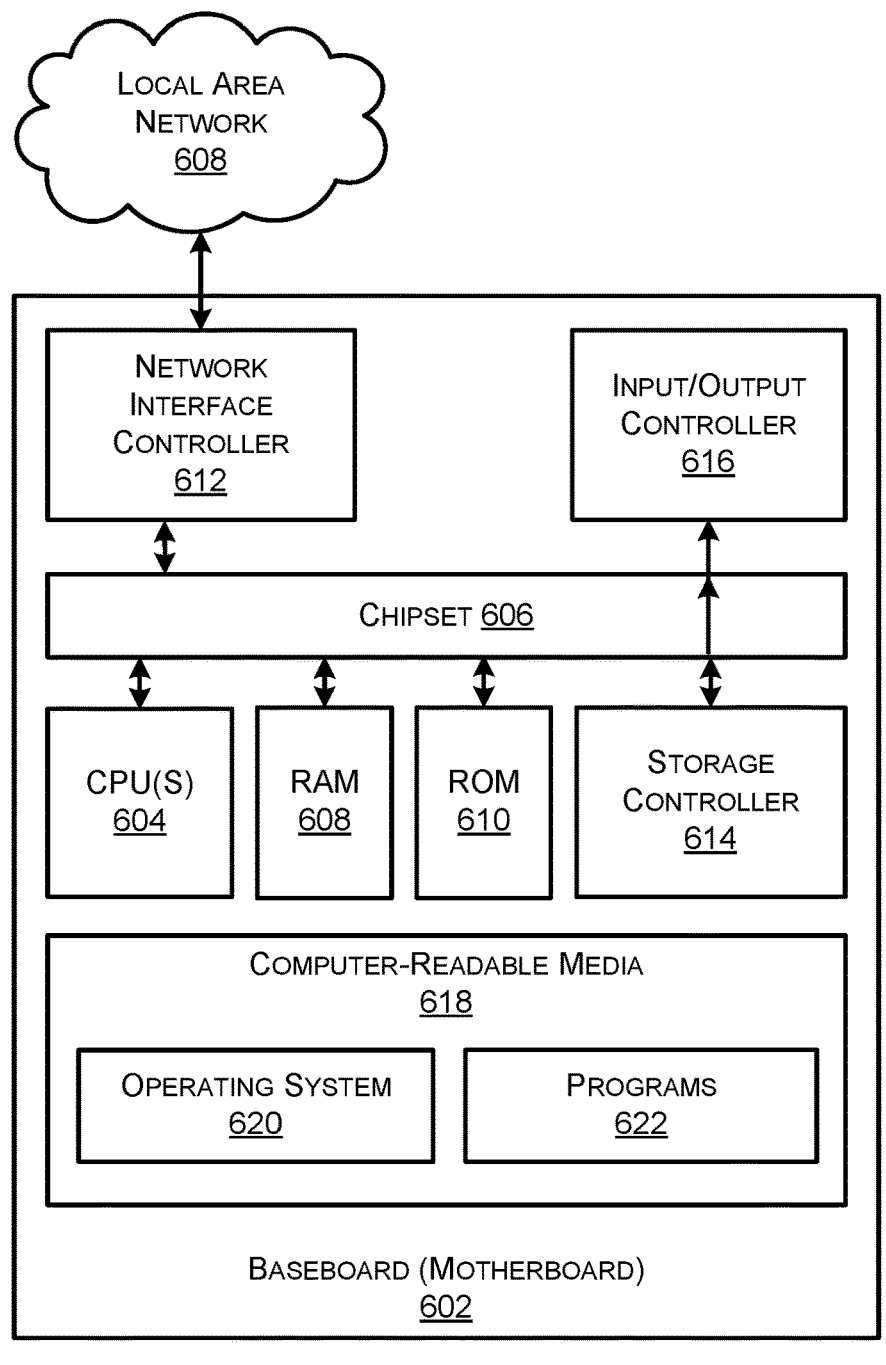
FIG. 6 is a computer architecture diagram showing an illustrative computer hardware architecture for implementing a computing device that can be utilized to implement aspects of the various technologies presented herein.

FIG. 6 shows an example computer architecture for a server computer 502 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The server computer 502 may, in some examples, correspond to a physical server in the data center(s) 106 (e.g., a physical server 106) described herein, and may include networked devices such as servers, switches, routers, hubs, bridges, gateways, modems, repeaters, access points, etc.

The computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as the network 508. The chipset 606 can include functionality for providing network connectivity through a NIC 612, such as a gigabit Ethernet adapter. The NIC 612 is capable of connecting the computer 502 to other computing devices over the network 508. It should be appreciated that multiple NICs 612 can be present in the computer 502, connecting the computer to other types of networks and remote computer systems.

The computer 502 can be connected to a storage device 618 that provides non-volatile storage for the computer. The storage device 618 can store an operating system 620, programs 622, and data, which have been described in greater detail herein. The storage device 618 can be connected to the computer 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 618 by detecting the physical states or characteristics of one or more particular locations within the physical storage units.

In addition to the mass storage device 618 described above, the computer 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 502. In some examples, the operations performed by devices in the distributed application architecture 100, and or any components included therein, may be supported by one or more devices similar to computer 502. Stated otherwise, some or all of the operations performed by the distributed application architecture 100, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 502. According to one embodiment, the operating system includes the LINUX operating system. According to another embodiment, the operating system includes the WINDOWS® SERVER operating system from MICROSOFT Corporation of Redmond, Wash. According to further embodiments, the operating system can include the UNIX operating system or one of its variants. It should be appreciated that other operating systems can also be utilized. The storage device 618 can store other system or application programs and data utilized by the computer 502.

In one embodiment, the storage device 618 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regard to FIGS. 1-4. The computer 502 can also include computer-readable storage media having instructions stored thereupon for performing any of the other computer-implemented operations described herein.

The computer 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

The computer 502 may generally include any type of computing device that may implement techniques described herein, and/or be included in a system of devices for implementing the techniques described herein (e.g., one or more devices in the computing infrastructure 102, one or more devices in the second computing infrastructure 104, and/or any combination thereof or any devices/systems/infrastructures described herein).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving an email for a user account registered with an email service;
extracting, from the email, a sender name and a sender address associated with a sender of the email;
comparing, by an email security platform, the sender name with the sender address;
generating, by the email security platform, a similarity value based on a result of the sender name being compared with the sender address;
determining, by the email security platform, that the email comprises the sender name impersonating a name of the sender, based on the similarity value meeting or exceeding a threshold value indicative of impersonation; and
deleting or quarantining the email from an inbox associated with the user account, based on the similarity value meeting or exceeding the threshold value,
wherein the similarity value is based on first characters in a first string associated with the sender name, second characters in a second string associated with the sender address, and one or more third consecutive characters in a first substring of the first string being determined to match one or more fourth consecutive characters in a second substring of the second string, the first substring being a same length as the second substring.

2. The method of claim 1, further comprising:
removing, based on a security policy, punctuation and a top-level domain (TLD) from the sender address to create a modified sender address as a replacement for the sender address,
wherein comparing the sender name further comprises comparing the sender name with the modified sender address.

3. The method of claim 1, further comprising:
generating, based on a security policy, an acronym associated with the sender name;
comparing the acronym with the sender address; and
generating a second similarity value based on a result of the acronym being compared with the sender address.

4. The method of claim 1, wherein determining whether the email comprises the sender name impersonating the name of the sender further comprises:
determining a difference between the similarity value and the threshold value;
normalizing and scaling the difference, as a modified difference; and
determining a confidence score associated with the modified difference, and
wherein deleting or quarantining the email is further based on the confidence score.

5. The method of claim 1, wherein:
the sender name is compared with the sender address, based on an algorithm applied to the first string associated with the sender name and the second string associated with the sender address; and
the algorithm is a longest common substring (LCS) algorithm.

6. The method of claim 1, further comprising:
removing, by the email security platform and based on a security policy, punctuation and a top-level domain (TLD) from the sender address to create a modified sender address as a replacement for the sender address,
wherein comparing the sender name with the sender address further comprises comparing the sender name with the modified sender address,
wherein generating the similarity value further comprises generating a modified similarity value based on a second result of the sender name being compared with the modified sender address, and
wherein determining whether the email comprises the sender name impersonating the name of the sender further comprises:
determining whether the email comprises the sender name impersonating the name of the sender, based on the modified similarity value meeting or exceeding the threshold value indicative of impersonation; and
determining that the email is malicious, based on a similarity between the sender name and the name of the sender, notwithstanding the email being received without any attachment or link.

7. The method of claim 1, wherein:
the user account is associated with a first domain name of a first party;
the sender name is associated with a name in a registry or list of names associated with the first party; and
the sender address comprises a second domain name of a second party being different than the first party.

8. The method of claim 1, wherein:
the sender name is compared with the sender address, based on an algorithm applied to a first string associated with the sender name and a second string associated with the sender address; and
the algorithm is a longest common substring (LCS) algorithm.

9. A system comprising:
one or more hardware processors; and
one or more non-transitory computer-readable media storing computer-executable instructions that, when executed by the one or more hardware processors, cause the one or more hardware processors to perform operations comprising:
receiving an email for a user account registered with an email service, the user account being associated with a first domain name of a first party;
extracting, from the email, a sender name and a sender address associated with a sender of the email, the sender name being associated with a name in a registry or list of names associated with the first party;
comparing, by an email security platform, the sender name with the sender address, the sender address comprising a second domain name of a second party being different than the first party;
generating, by the email security platform, a similarity value based on a result of the sender name being compared with the sender address;
determining, by the email security platform, that the email comprises the sender name impersonating a name of the sender, based on the similarity value meeting or exceeding a threshold value indicative of impersonation; and
deleting or quarantining the email from an inbox associated with the user account, based on the similarity value meeting or exceeding the threshold value.

10. The system of claim 9, the operations further comprising:
removing, based on a security policy, punctuation and a top-level domain (TLD) from the sender address to create a modified sender address as a replacement for the sender address,
wherein comparing the sender name further comprises comparing the sender name with the modified sender address.

11. The system of claim 9, the operations further comprising:
generating, based on a security policy, an acronym associated with the sender name;
comparing the acronym with the sender address; and
generating a second similarity value based on a result of the acronym being compared with the sender address.

12. The system of claim 9, wherein the similarity value is based on first characters in a first string associated with the sender name, second characters in a second string associated with the sender address, and one or more third consecutive characters in a first substring of the first string being determined to match one or more fourth consecutive characters in a second substring of the second string, the first substring being a same length as the second substring.

13. The system of claim 9, wherein determining whether the email comprises the sender name impersonating the name of the sender further comprises:
determining a difference between the similarity value and the threshold value;
normalizing and scaling the difference, as a modified difference; and
determining a confidence score associated with the modified difference, and
wherein deleting or quarantining the email is further based on the confidence score.

14. The system of claim 9, wherein:
the sender name is compared with the sender address, based on an algorithm applied to a first string associated with the sender name and a second string associated with the sender address; and
the algorithm is a longest common substring (LCS) algorithm.

15. One or more non-transitory computer-readable media storing computer-executable instructions that, when executed by one or more processors, cause the one or more processors to perform operations comprising:
receiving an email for a user account registered with an email service;
extracting, from the email, a sender name and a sender address associated with a sender of the email;
comparing, by an email security platform, the sender name with the sender address;
generating, by the email security platform, a similarity value based on a result of the sender name being compared with the sender address;
determining, by the email security platform, that the email comprises the sender name impersonating a name of the sender, based on a difference between the similarity value and a threshold value;
normalizing and scaling the difference, as a modified difference;
determining a confidence score associated with the modified difference; and
deleting or quarantining the email from an inbox associated with the user account, based on the confidence score being indicative of impersonation.

16. The one or more non-transitory computer-readable media of claim 15, the operations further comprising:
removing, based on a security policy, punctuation and a top-level domain (TLD) from the sender address to create a modified sender address as a replacement for the sender address,
wherein comparing the sender name further comprises comparing the sender name with the modified sender address.

17. The one or more non-transitory computer-readable media of claim 15, the operations further comprising:
generating, based on a security policy, an acronym associated with the sender name;
comparing the acronym with the sender address; and
generating a second similarity value based on a result of the acronym being compared with the sender address.

18. The one or more non-transitory computer-readable media of claim 15, wherein the similarity value is based on first characters in a first string associated with the sender name, second characters in a second string associated with the sender address, and one or more third consecutive characters in a first substring of the first string being determined to match one or more fourth consecutive characters in a second substring of the second string, the first substring being a same length as the second substring.

19. The one or more non-transitory computer-readable media of claim 15, wherein:
   the user account is associated with a first domain name of a first party;
   the sender address comprises a second domain name of a second party;
   the second party is different than the first party; and
   the sender name is associated with a name in a registry or list of names associated with the first party.

20. The one or more non-transitory computer-readable media of claim 15, wherein:
   the sender name is compared with the sender address, based on an algorithm applied to a first string associated with the sender name and a second string associated with the sender address; and
   the algorithm is a longest common substring (LCS) algorithm.

* * * * *